(12) United States Patent
Bunyan et al.

(10) Patent No.: US 10,445,290 B1
(45) Date of Patent: Oct. 15, 2019

(54) SYSTEM AND METHOD FOR A SMART CONFIGURABLE HIGH PERFORMANCE INTERACTIVE LOG FILE VIEWER

(71) Applicant: Cadence Design Systems, Inc., San Jose, CA (US)

(72) Inventors: Graeme Bunyan, San Jose, CA (US); Donald J. O'Riordan, Sunnyvale, CA (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 870 days.

(21) Appl. No.: 14/527,443

(22) Filed: Oct. 29, 2014

(51) Int. Cl.
| | |
|---|---|
| G06F 3/048 | (2013.01) |
| G06F 16/16 | (2019.01) |
| G06F 3/0484 | (2013.01) |
| G06F 9/445 | (2018.01) |
| G06F 3/00 | (2006.01) |

(52) U.S. Cl.
CPC ........ *G06F 16/168* (2019.01); *G06F 3/04842* (2013.01); *G06F 9/44526* (2013.01)

(58) Field of Classification Search
CPC ............. G06F 3/04842; G06F 9/45512; G06F 16/168; G06F 9/44526
See application file for complete search history.

(56) References Cited

U.S. PATENT DOCUMENTS

| | | | | |
|---|---|---|---|---|
| 5,686,937 A * | 11/1997 | Li | ...................... | G06F 3/04855 345/684 |
| 5,847,972 A * | 12/1998 | Eick | ...................... | G06F 11/323 345/440 |
| 5,995,101 A * | 11/1999 | Clark | .................. | G06F 3/04895 715/711 |
| 6,871,345 B1 * | 3/2005 | Crow | ...................... | G06F 8/656 717/175 |
| 6,879,995 B1 * | 4/2005 | Chinta | .................... | H04L 67/24 709/204 |
| 6,983,331 B1 * | 1/2006 | Mitchell | ................ | H04L 67/06 709/246 |
| 7,026,603 B2 * | 4/2006 | Taylor | .................... | G01M 11/33 250/227.15 |
| 7,228,492 B1 * | 6/2007 | Graham | ............. | G06F 16/9535 715/234 |
| 7,912,458 B2 * | 3/2011 | Ramer | ............. | G06F 17/30905 455/414.1 |

(Continued)

*Primary Examiner* — Nicholas Augustine
(74) *Attorney, Agent, or Firm* — Tarolli, Sundheim, Covell & Tummino LLP

(57) ABSTRACT

A system, method, and computer program product for interactively viewing output log files in an electronic design automation framework. An interactive log file viewer may be configured to identify text objects (such as warnings and error messages) in log files, to render the text objects in a display according to a registered style, and to define responses triggered by user interface interaction with the text objects. Embodiments may read portions of the log files and use plug-ins to identify, render, and respond as configured, according to the text objects found. Callback actions may provide a user more detailed information corresponding to the text object, such as a tool tip or contextual data, and may highlight and select a corresponding design object in a schematic displayed by an integrated electronic design automation application. An arbitration process may select the best callback action for a given log file.

20 Claims, 13 Drawing Sheets

(56) References Cited

U.S. PATENT DOCUMENTS

| | | | | |
|---|---|---|---|---|
| 7,958,486 B2* | 6/2011 | Tsyganskiy | G06F 8/72 | 715/713 |
| 8,024,308 B2* | 9/2011 | Jones | G06F 17/30442 | 707/705 |
| 8,381,197 B2* | 2/2013 | Meenakshisundaram | G06F 11/3664 | 717/135 |
| 8,726,209 B1* | 5/2014 | Lamant | G06F 11/3664 | 716/102 |
| 8,789,020 B2* | 7/2014 | Chung | G06F 11/3664 | 717/124 |
| 9,058,424 B1* | 6/2015 | Bienkowski | G06F 11/3684 | |
| 9,176,840 B2* | 11/2015 | Brodeur | G06F 11/327 | |
| 2005/0223282 A1* | 10/2005 | Frey | G06F 11/3476 | 714/20 |
| 2005/0228814 A1* | 10/2005 | Plow | G06F 3/0485 | |
| 2011/0016347 A1* | 1/2011 | Brodeur | G06F 11/327 | 714/2 |
| 2014/0075430 A1* | 3/2014 | Zheng | G06F 8/62 | 717/174 |
| 2014/0351137 A1* | 11/2014 | Chisholm | G06Q 20/04 | 705/44 |
| 2015/0341460 A1* | 11/2015 | Kovvuri | H04L 67/10 | 709/219 |

* cited by examiner

FIG. 8

```
;; MyPlugin::initializeInstance
(defmethod initializeInstance ((this MyPlugin) @rest args)
  ;; Call superclass constructor
  (apply 'callNextMethod this args)
  ;; Define a pattern which pushes 'WarningState for the duration of the match
  allPatterns = (list
                  (nil ;; Warnings
                    'pattern "^\\S*\(WARNING\).*$"
                    'highlight (1)
                    'type     'Block
                    'format ( nil
                              'background "white"
                              'foreground "blue" )
                    'priority 50
                    'font ( nil
                            'size "+2"
                            'italic nil)
                    (interactive nil) ; No hover/click action for entire line
                    (pushState 'WarningState)
                  )
                )
  (addPatterns allPatterns)
```

Warning from simulator during initial setup:
WARNING (CMI-2419) ;
WARNING (CMI-2419) ;
WARNING (CMI-2477) ;

```
;; Define pattern which is only valid during warning state
warningPatterns = (list
    (nil
     'pattern "WARNING (\([^\)]+\))"
     'highlight (1)
     'action "invokeHelpForMessageID(\o \w \1)"   ; \w -> 
                                                   window, \o -> object, \1 == backcapture
     'tooltip "Show help for message \1"
     'type 'Char ; Default (others: Block)
     'format (nil
              'foreground "cyan")   ;; hyperlink-y
     'font (nil
            'underline t)
     )
   )
(addPatterns warningPatterns ?state 'WarningState)
```

"WARNING *(CMI-2318)*: I4.I177.PM0: Parasitic resistor 'rs' has been..."

SYSTEM AND METHOD FOR A SMART CONFIGURABLE HIGH PERFORMANCE INTERACTIVE LOG FILE VIEWER

FIELD OF THE INVENTION

This description relates to the field of circuit simulation, and more precisely to more easily managing log files from electronic design automation tools to more clearly relate data they contain to other aspects of a circuit design.

BACKGROUND

Many electronic design automation (EDA) engines such as circuit simulators and design comparison tools produce textual log files and other output reports that, in this description are generally referred to as log files for convenience. These log files may contain references among the text to various design objects, tool options, and other text files, along with various corresponding error messages and warnings. The log files may be very large in size for a typical modern circuit design, to the point that reading and processing a complete log file may be computationally expensive.

The current state of the art for viewing a log file in an EDA framework is often limited to merely showing a circuit designer the log file in a plain text file viewer. As a result, the circuit designer using such a plain text file viewer is generally unable to interact with the rest of the EDA environment interface in an effective, coordinated manner. It is generally incumbent upon the user to read and manually parse the text file, and to mentally map the objects referred to within the text to other objects within the circuit design.

Thus there is a need for an improved approach to managing electronic design automation (EDA) output log files and the relevant design data they contain. Accordingly, the inventors have developed a novel way to help circuit designers review data in log files and thereby more intuitively relate that information to other aspects of a circuit design.

BRIEF DESCRIPTION OF THE DRAWINGS

FIG. 8 is a listing of a warning highlighter configuration, according to an embodiment.

FIG. 9 is a diagram of warnings rendered according to a registered highlighting style, according to an embodiment.

FIG. 10 is a listing of another warning highlighter configuration, according to an embodiment.

DETAILED DESCRIPTION

This description presents an easy to use system, method, and computer program product for interactively viewing log files in an electronic design automation framework. Embodiments enable configuration of an interactive log file viewer to identify text objects in log files, visually render the text objects in a display according to predetermined specifications, and to define how the viewer will respond to various user interactions that may occur with the text objects. Embodiments may then read in the log file, or relevant portions of the log file at a time for computational efficiency, and process the log file according to the configuration. Log files of any size and any format may be accommodated. Configurability may be provided via plug-ins.

The processing may comprise identifying actual text objects of interest, rendering actual text objects in the display, and responding to various user interactions with the actual text objects. The responding may then comprise invoking callback actions that integrate EDA applications to help provide more intuitive meaning and more specific guidance from the log file data to a circuit designer. The highly configurable and extensible approach described provides an infrastructure for dealing with log files that may be extended to deal with many different types of log files, containing objects of different types, and representing many different EDA tools and applications managed by an EDA framework.

Figure 1:
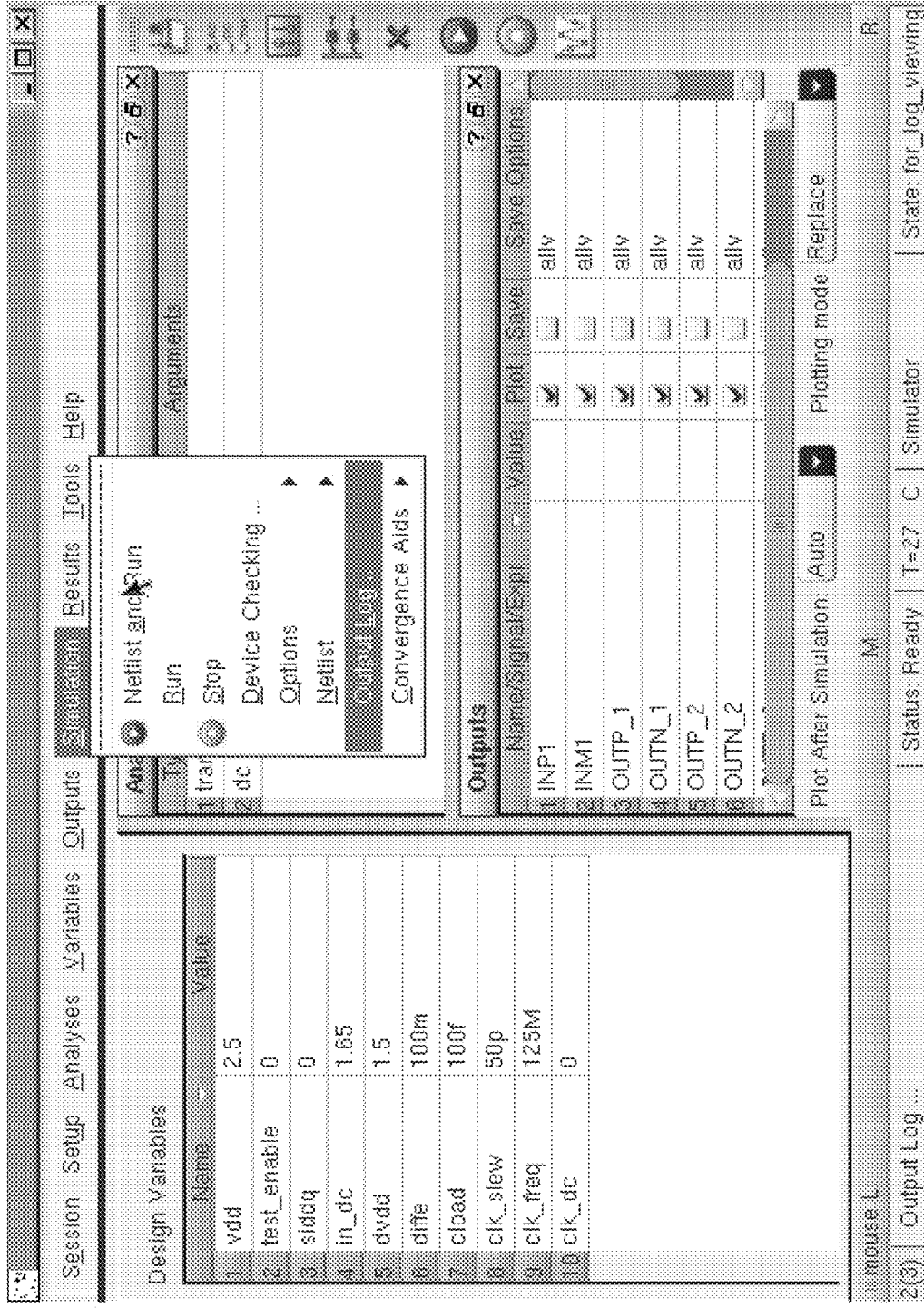
FIG. 1 is a diagram of a simulation environment, according to an embodiment.

FIG. 1 shows a diagram of a simulation environment 100, according to an embodiment. In this example, a commercial design environment that is familiar to circuit designers may have several commands provided in a drop-down menu to assist with reviewing simulation results. An "Output Log" option that may previously have triggered only a plain text log file viewer in response to a user selection may instead now call the interactive log file viewer of an embodiment.

Figure 2:
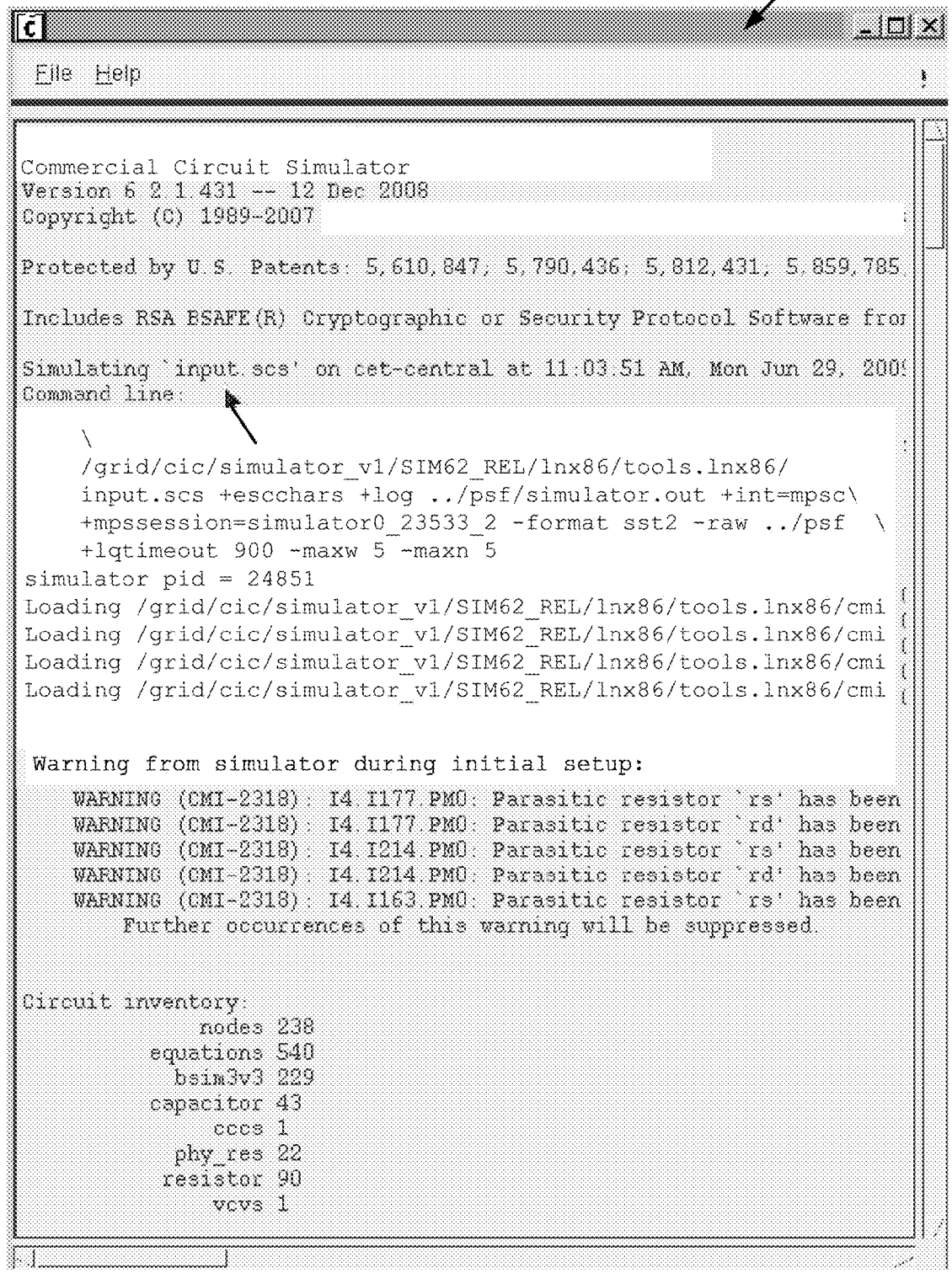
FIG. 2 is a diagram of a log file listing, according to an embodiment.

FIG. 2 shows a diagram of a log file listing 200, according to an embodiment. The conventional log file viewer is unable to interact with the rest of the design environment interface. The user is thus generally required to read and parse the text file displayed, and mentally map the objects referred to within the text to other objects within the design environment. For example, the log file of FIG. 2 contains (shown under the display cursor), a line of text of the following form:

"Simulating 'input.scs' on cet-central at . . . "

The "input.scs" file in this case refers to the simulator's input deck, which is itself another text file produced by the design environment, typically as a result of netlisting an input circuit schematic. The input deck may further comprise various instructions to the simulator about what analyses to run, their options/values, etc. In this exemplary log file, the simulator issued various warnings such as:

"WARNING (CMI-2318): I4.I177.PM0: Parasitic resistor 'rs' has been . . . "

which contains a reference to a particular warning mnemonic identifier (CMI-2318) and a particular device instance (I4.I177.PM0) within a user's circuit design hierarchy.

Log files produced by EDA tools tend to contain numerous errors, warnings, and information statements of various kinds that reference other objects within the user's design environment. It is generally up to the user to go to the corresponding portion of the design environment to discern the meaning of these statements. For example, investigation of the warning described above may require the user to identify and open the correct input.scs file in another text viewer, open the schematic editor and locate hierarchical instance I4.I177.PM0 in the circuit schematic.

Figure 3:
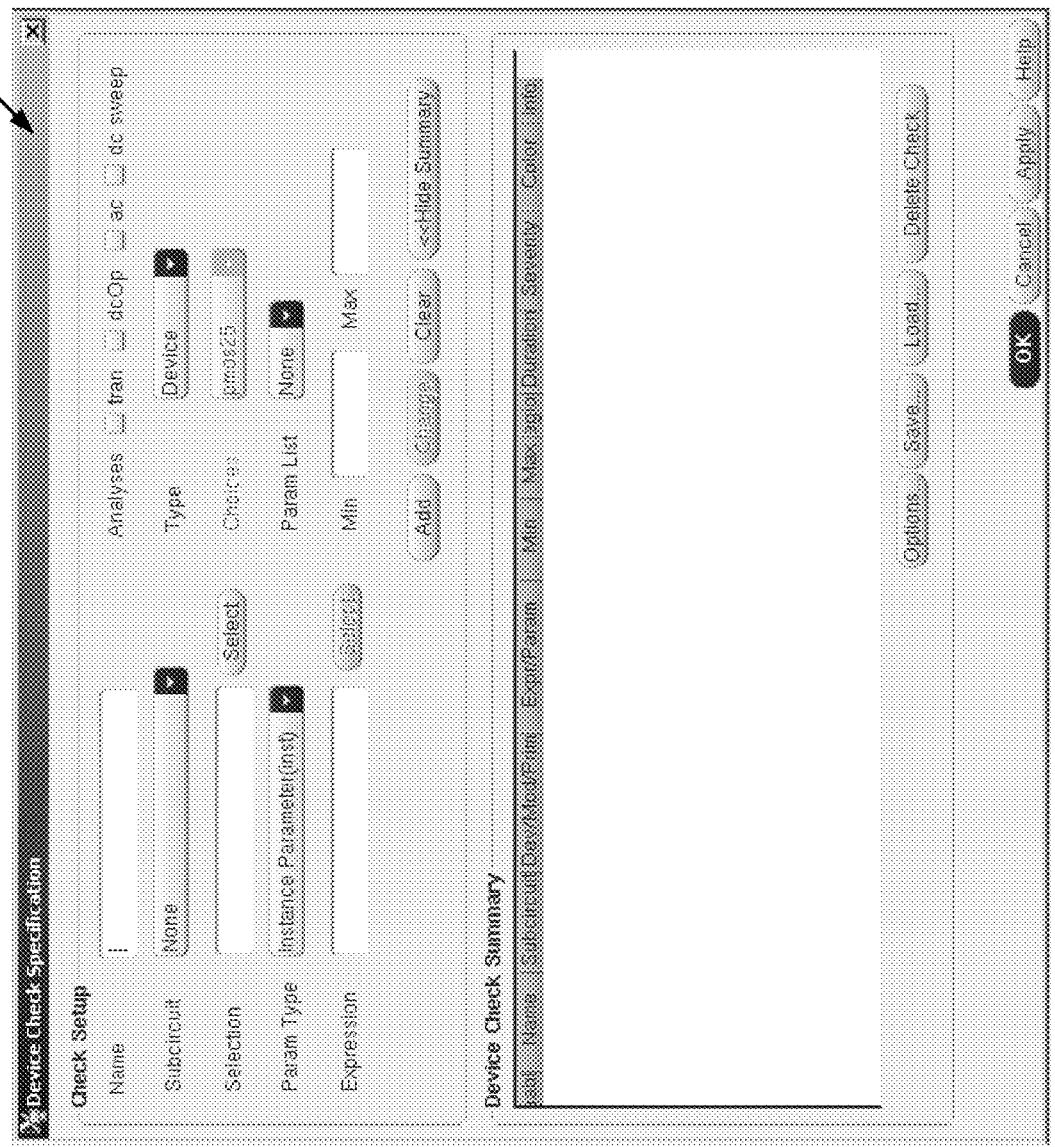
FIG. 3 is a diagram of a device check tool, according to an embodiment.

FIG. 3 shows a diagram of a device check tool 300, according to an embodiment. The user investigating the warning described above may be required to manually enter or look up the name of a device instance (I4.I177.PM0) to pull up information about the particular device model that corresponds to that device instance. The device check tool may for example provide some enlightenment regarding the parasitic resistor rs mentioned in the warning. Similar special graphical user interfaces (GUIs) may be provided by EDA tool vendors for querying and presenting various structured databases produced during advanced simulation analyses.

Unfortunately, like the log files viewed in a plain text viewer, such interfaces may not yet be coordinated to simplify the user's task of reviewing and understanding the voluminous output of today's EDA tools. When things go wrong in a design session, a user may spend a large amount of time scanning the log files produced by the various design tools. The corresponding design elements, once tracked down, may be inspected and perhaps edited as part of the design debugging process.

Since the object coordination problem is so widespread, and since many different log files of different types may need to be processed, a general solution has proven elusive. Prior approaches to interactive log file generation are not sufficiently scalable. For example, the practice of parsing the log file data and creating a marked up copy of the text (using a markup language such as HTML) that is then viewed in a browser suffers from performance problems. The process of marking up the gigantic log files typically produced in EDA flows introduces memory and I/O management problems, and such parsers are often hardcoded to deal only with a single log file class. The interaction model provided by such approaches is also quite limited.

Embodiments therefore enable more meaningful user log file interaction by providing a more configurable and interactive log file viewing capability. Embodiments described below may be easily configured to identify arbitrary text items of interest within arbitrarily large log files of any format, to describe how these items of interest are to be rendered, and to describe how the items are to behave if a user should interact with them in various ways.

High performance may be achieved by considering only the visible pages of the log file at a time (along with their nearby neighbor pages), rather than trying to deal with the entire log file all at once. The method provided is thus dynamic, scanning segments of the text as a user performs scrolling operations, looking within those segments (e.g., the displayed portion plus a few pages before and after if available) for text items of interest, and rendering them using their pre-registered style. When a window of text is to be presented, the text items within that window may be compared against a pre-registered library of patterns, each of which may be associated with a display style and various actions.

Any text items that match items in the registered library may be visually rendered in a display using the registered display style (for example, a heading style, a warning style, an error style, or a hyperlink style), and associated with registered actions. For example, should a user subsequently hover the cursor over one of these items, a tool tip action may be triggered, and a tool tip showing the item content may be dynamically created based on the configuration information provided during registration. Should a user click the primary mouse button on a text item which is displayed in hyperlink style, a particular callback action (again determined during registration) will be invoked, with various pre-selected portions of the matching text item passed as arguments to a callback function to be described. Should the secondary mouse button be clicked, a context menu may be dynamically created and populated, again based on information provided for that text pattern during registration.

The triggered behaviors may comprise a deep integration into the EDA tool suite. By making this capability configurable, a single infrastructure for dealing with log files may be extended to deal with many different types of log files, containing objects of different types, representing many different EDA tools and applications managed by the design framework.

Figure 4:
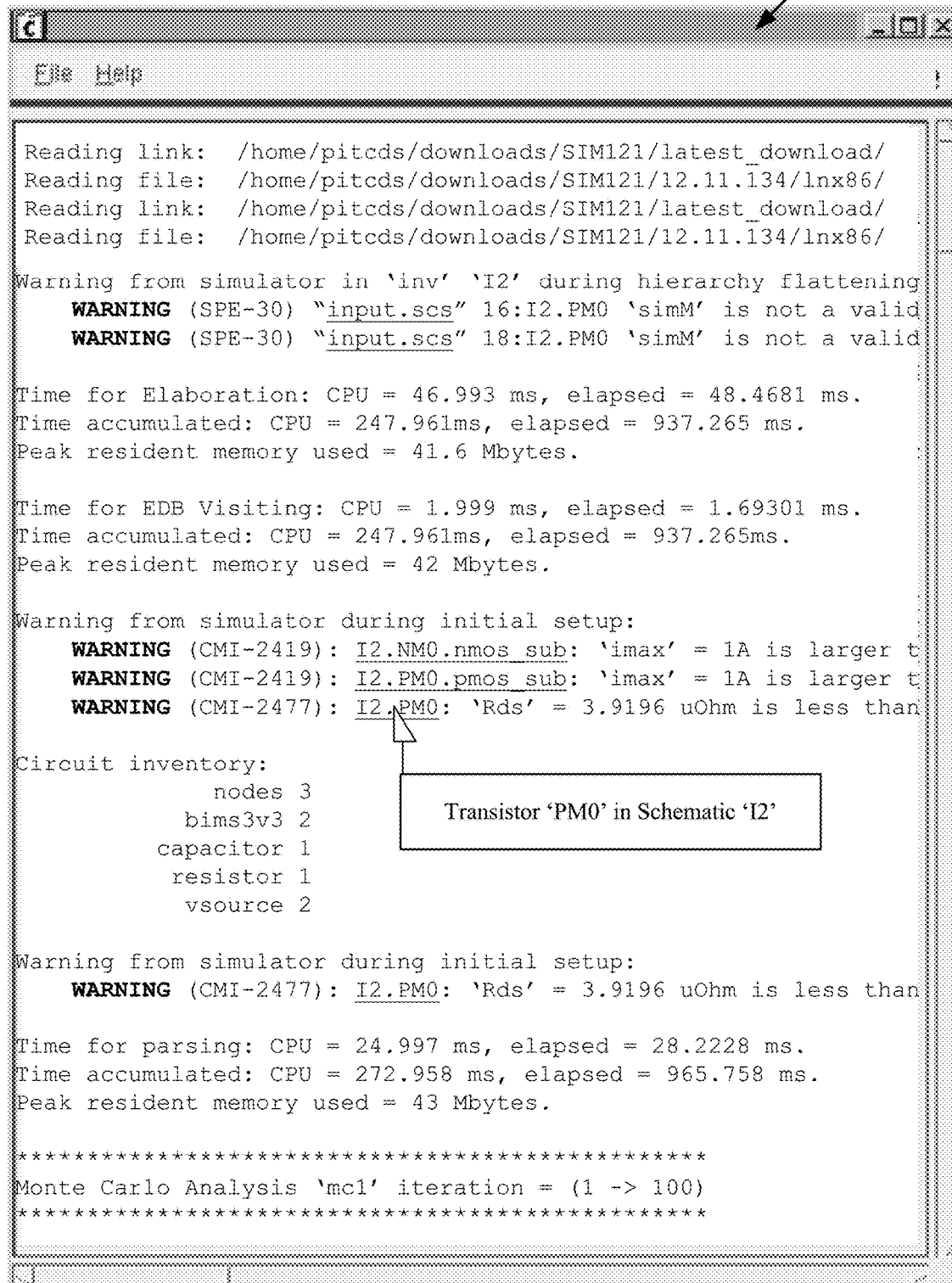
FIG. 4 is a diagram of a log file listing with relevant objects displayed according to registered styles, according to an embodiment.

FIG. 4 shows a diagram of a log file listing 400 with relevant objects displayed according to registered styles, according to an embodiment. In FIG. 4, different pieces of text have been associated with different display styles and actions as specified during a configuration process. For example, the "WARNING" keyword is highlighted, various filenames such as "input.scs" and circuit objects (such as "I2.PM0") are highlighted in a hyperlink style, and a tool tip for the hyperlink is also shown.

In one embodiment, when the user hovers the cursor over a hyperlink, a tool tip appears that describes this object in the context of the EDA framework, as shown. When the user right-clicks a mouse on a hyperlink, a context menu (not shown) may appear. When the user clicks the left mouse button on a hyperlinked object, the callback function may perform a deeply meaningful and helpful EDA application integration function to provide user insight not available with conventional tools.

Figure 5:
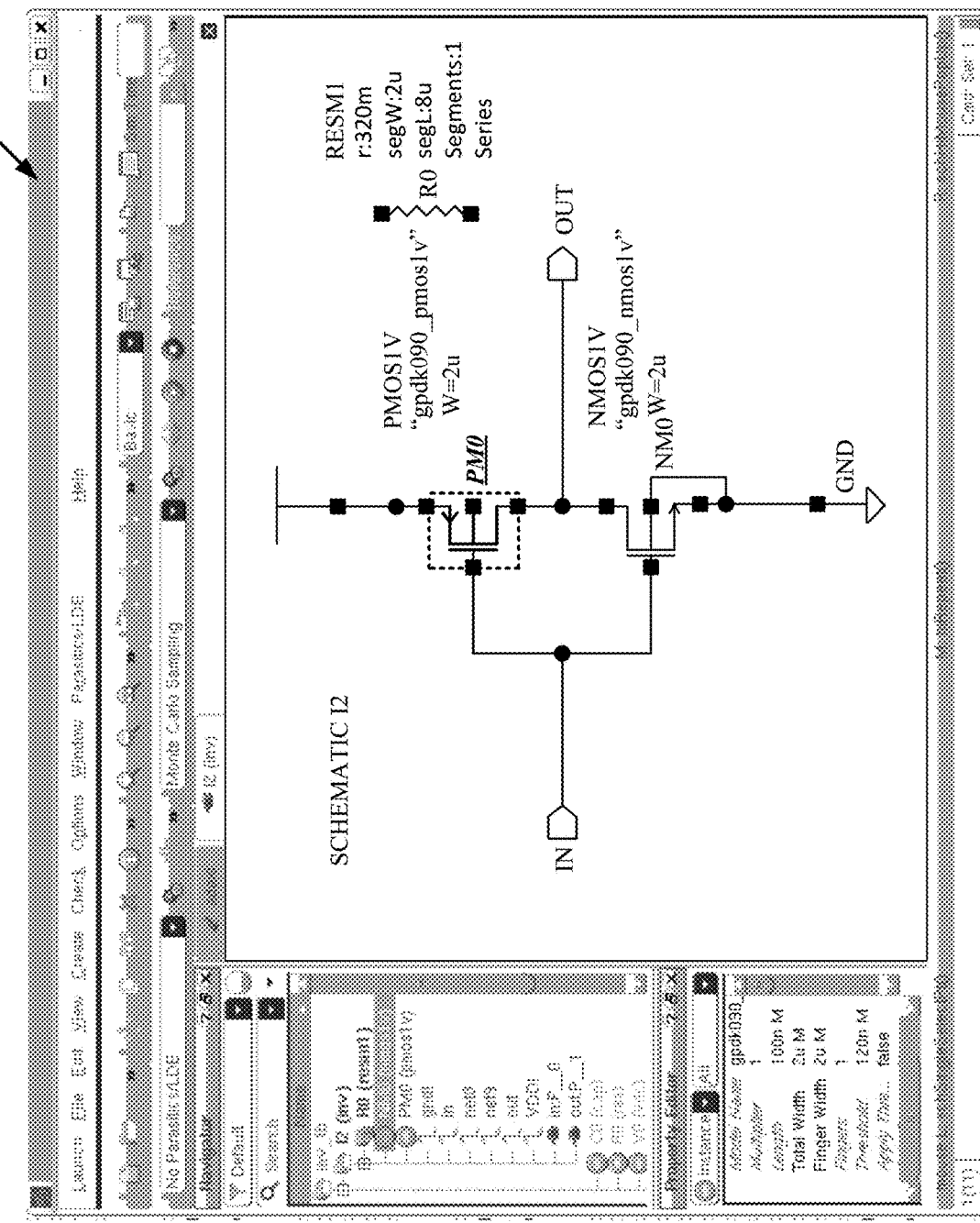
FIG. 5 is a diagram of a circuit schematic in a design environment corresponding to a log file object, according to an embodiment.

FIG. 5 shows a diagram of a circuit schematic 500 in a design environment corresponding to a log file object, according to an embodiment. In response to the user interaction described, above, the callback integration function may for example call the appropriate EDA tool and automatically locate and highlight the corresponding design object (e.g., I2:PM0) in the circuit design schematic. Similarly, more details about the corresponding design object may be automatically presented in a popup window, or in a specialized design environment GUI such as the device checker of FIG. 3 with correspondingly populated fields.

Embodiments may be configured initially by registering at least one plug-in that selectively passes text objects matching pre-defined criteria from particular types of log files as arguments to the callback action upon user interaction. A plug-in is a familiar software component that adds a specific feature to an existing software application and is thus one frequently-used means for providing customization. Although plug-ins are described in the examples below, any means for selecting objects as arguments to a callback action may be within the scope of the invention.

Design tool management groups and/or internal design tool vendor application teams may register different types of text log files, with different support for each, using a public configuration mechanism. This mechanism may:

Provide a text widget that may be customized to highlight keywords and associate actions with hyperlinked text.

Provide a generic plug-in which may be easily customized (subclassed) by applications.

Automatically determine which of a list of available plug-ins should be loaded for a given text window/file type/file content.

Allow multiple applications to launch independent widgets with specific customizations in the same session.

During EDA system initialization typically, a number of different plug-ins (e.g., one per different log file type) may be registered with the EDA system via code supplied by a user or a design tool management group, in addition to the plug-ins that ship with the EDA system by default. Each plug-in may inherit from a common system-provided base class. During initialization, each plug-in may indicate its preference or ability for dealing with various files (essentially reporting: "I recognize this type of file so please use me to deal with it.").

Figure 6:
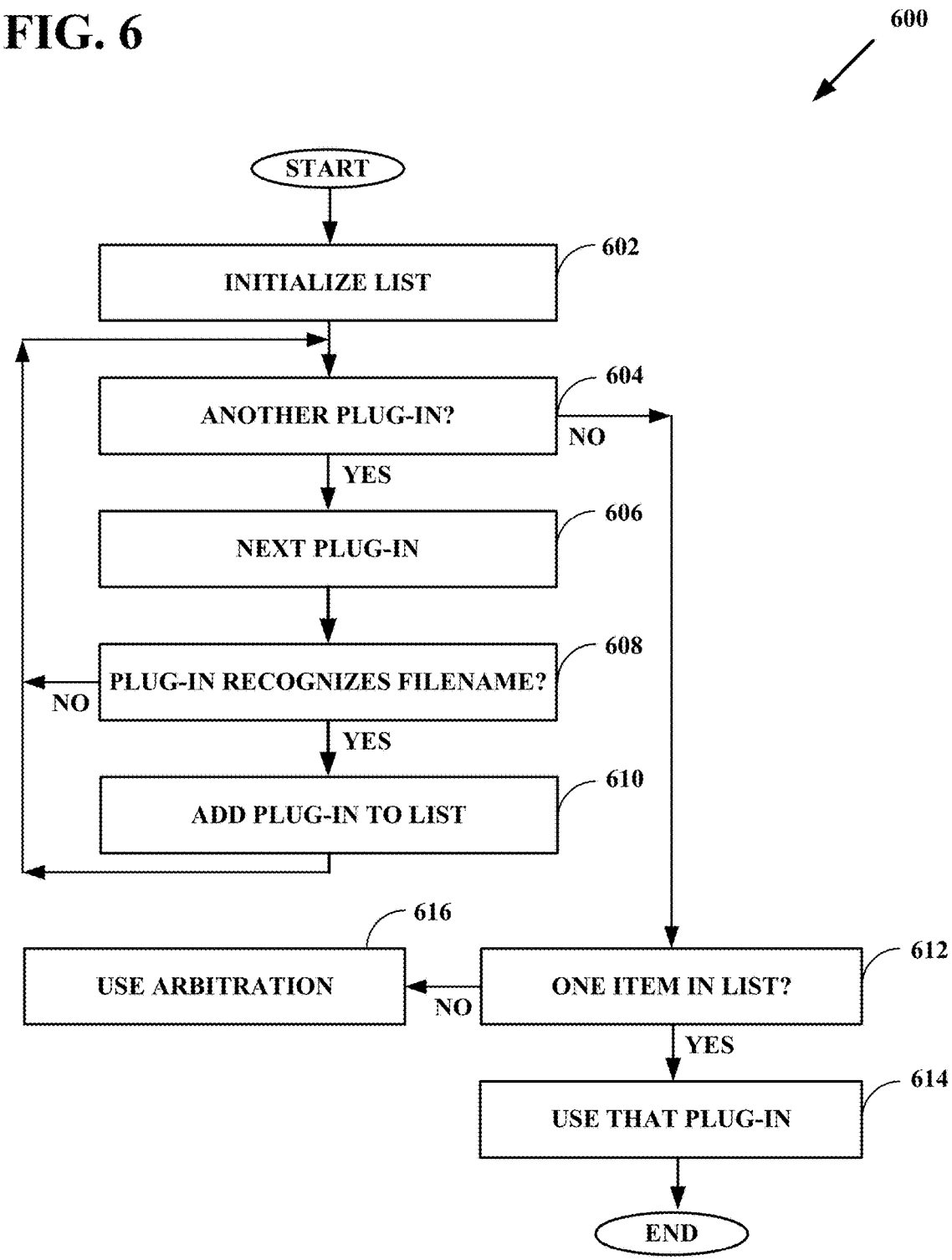
FIG. 6 is a flowchart of a plug-in registration process, according to an embodiment.

FIG. 6 shows a flowchart of a plug-in registration process 600, according to an embodiment. At 602, a list of plug-ins may be initialized, such as those supplied with the EDA system by default. At 604, availability of another plug-in may be checked, with the next plug-in processed following 606, or the check-in processing may proceed to 612 if no additional plug-ins exist. At 608, a given plug-in may determine and indicate its support for a particular type of file by recognizing its filename extension as noted in 610, or may not indicate its support. Each plug-in therefore may register a list of filename extensions it knows how to process.

When a log file is to be processed and displayed to the user, embodiments may either use a hard-coded specific plug-in, or enter a plug-in selection process to determine which plug-in from the list of registered plug-ins is to be used when rendering the file. Thus, if only one plug-in recognizes the filename extension in the selection process at 612, then that plug-in may be used at 614. If however multiple plug-ins recognize the filename extension, then an arbitration process may be triggered at 616. In the absence of an arbitration process, the first operable plug-in may simply be used instead, and/or an error message denoting plug-in conflict may be outputted.

Figure 7:
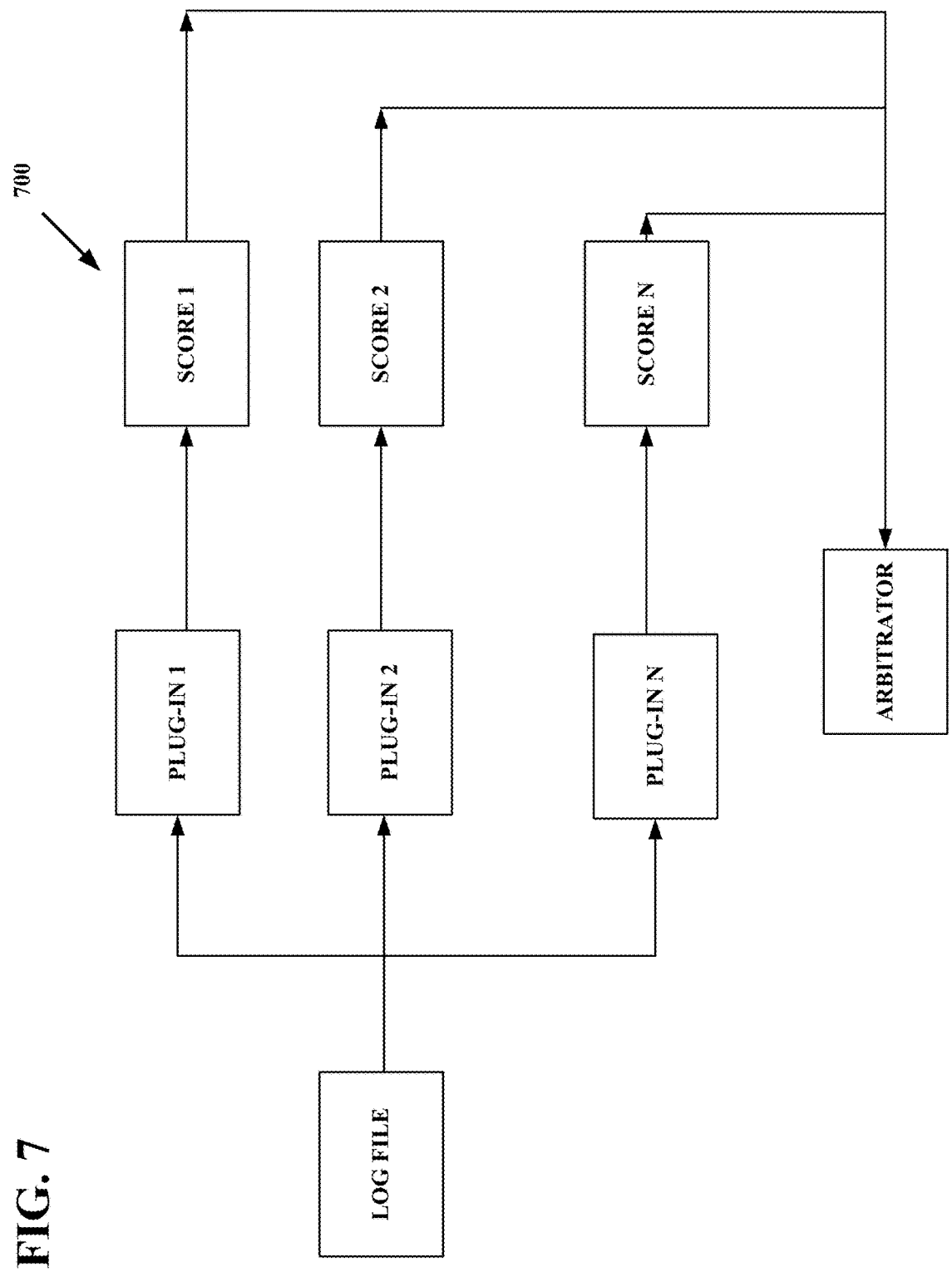
FIG. 7 is a diagram of a plug-in arbitration process, according to an embodiment.

FIG. 7 shows a diagram of a plug-in arbitration process 700, according to an embodiment. When plug-in conflicts needing arbitration occur (that is, multiple plug-ins are identified that claim they can deal with a file of a given file extension, as at 616 of FIG. 6), each of the conflicting plug-ins may be fed a portion of the file to be processed. Each plug-in may parse the contents and return a score indicating its own confidence level in dealing with that file's contents, based on the parsed results (that is, how closely the parsed data matches the expected data for that plug-in). Each plug-in may also provide a program method that reads a portion of a file, and returns a score (e.g., a value from one to one hundred) indicating its degree of recognition of the file contents. An arbitrator may then simply select the plug-in with the best reported score for dealing with this particular file. The end result is that the best available plug-in may be selected from among many candidates.

FIG. 8 shows a listing of a warning highlighter configuration 800, according to an embodiment. Configurability may be provided via a customization language. In one embodiment, this language is the SKILL language, but other languages (such as XML) could equally well be employed. The configuration application program interface (API) may allow each plug-in to register a selection of patterns, each of which may be associated with a state, a regular expression, a description of how the text that matches the pattern in the regular expression is to be highlighted, a new state (if any) to be entered upon a match, and a set of properties indicating how the system is to allow the user to interact with the matching text. For example, highlighting may be controlled by a style chosen from a list of pre-defined styles, or by a style defined on the fly. Interaction may for example be via hyperlinks with configurable actions, via context menus, and/or via tool tips.

A single pattern for WARNING text patterns is shown in the exemplary listing of FIG. 8. The pattern field allows a regular expression to be provided in which the text to be found and highlighted is programmed. In this case, the word "WARNING" in uppercase will be found and highlighted (the first matching group is specified in the "highlight" field. The highlighting style to be used here is block style, with a white background color and blue foreground color. In this example, low level styling details are supplied, but in an alternate embodiment a named highlight style may be chosen from a list of available pre-defined highlighting styles. The "+2" relative font size is to be used, and no interactive elements are supported, in this non-limiting example. Note also the pushState/popState capability, which allows state-specific patterns to be registered (that is, stateful parsing) for maximum flexibility and power.

When rendered, the WARNING keyword will therefore be presented in blue font with no interaction supported, as shown in FIG. 9. In general, any font, color, and other style details may be specified. FIG. 9 shows a diagram of warnings 900 rendered according to a registered highlighting style, according to an embodiment.

FIG. 10 shows a listing 1000 of another warning highlighter configuration, according to an embodiment. In this second example, a plug-in may recognize a particular type of warning, e.g. "(CMI-2318)" and create a clickable hyperlink style that is associated with that warning. When rendered, a match for the pattern of FIG. 10 may be shown in the log file viewer excerpt shown in FIG. 11.

Figure 11:
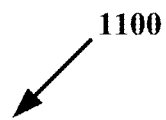
FIG. 11 is a diagram of warnings rendered according to a registered hyperlink style, according to an embodiment.

FIG. 11 shows a diagram of warnings 1100 rendered according to a registered hyperlink style, according to an embodiment. In this example, the 'pattern "WARNING (\([^)]+\))" in FIG. 10 uses regular expression memory groups to match all non-space characters that follow the WARNING keyword, and highlights the first matching group highlight (1) in a hyperlink-style. It also registers a callback action, string 'action "invokeHelpForMessageiD (\o\w\1)", which will cause the system to call the invokeHelpForMessageID( ) function whenever the user clicks the primary mouse button on the hyperlink. Further, that callback function will be passed three values, which include:

1. The entire matched text object (\o is used as a placeholder).
2. The window id of the window containing the text viewer (\w is the placeholder).
3. The first regular expression memory group (\1 is the placeholder) matched in the pattern expression.

In this example, the action string is taken, objects beginning with backslashes such as (\o, \1,\w, etc.), are substituted into this string with the actual values determined either by the system (for the window ID \w) or the regular expression pattern (\o, \1, etc.), and the resulting string is then evaluated by the host scripting language (e.g. SKILL). This provides the callback function the link context, so that it may do the appropriate thing. In this case, the callback function may be coded to popup a window giving more details about the particular error message "CMI-2318" (the value of \1) so that the user may understand why exactly a particular resistor rs has been eliminated or reduced. The callback function may also use the system-provided \w window ID as the parent for the popup window.

In this example, no context menu is provided, but a tool tip is provided, via 'tooltip "Show help for message \1". Note again the presence of the \1 memory group in the tool tip string. When the tool tip is presented, the value of the first memory group (CMI-2318) may be substituted into the tool tip string.

To recap, this description presents a highly configurable log file viewer, to display log file text with various pre-configured items of interest rendered in different styles, and to support different user interaction models.

Figure 12:
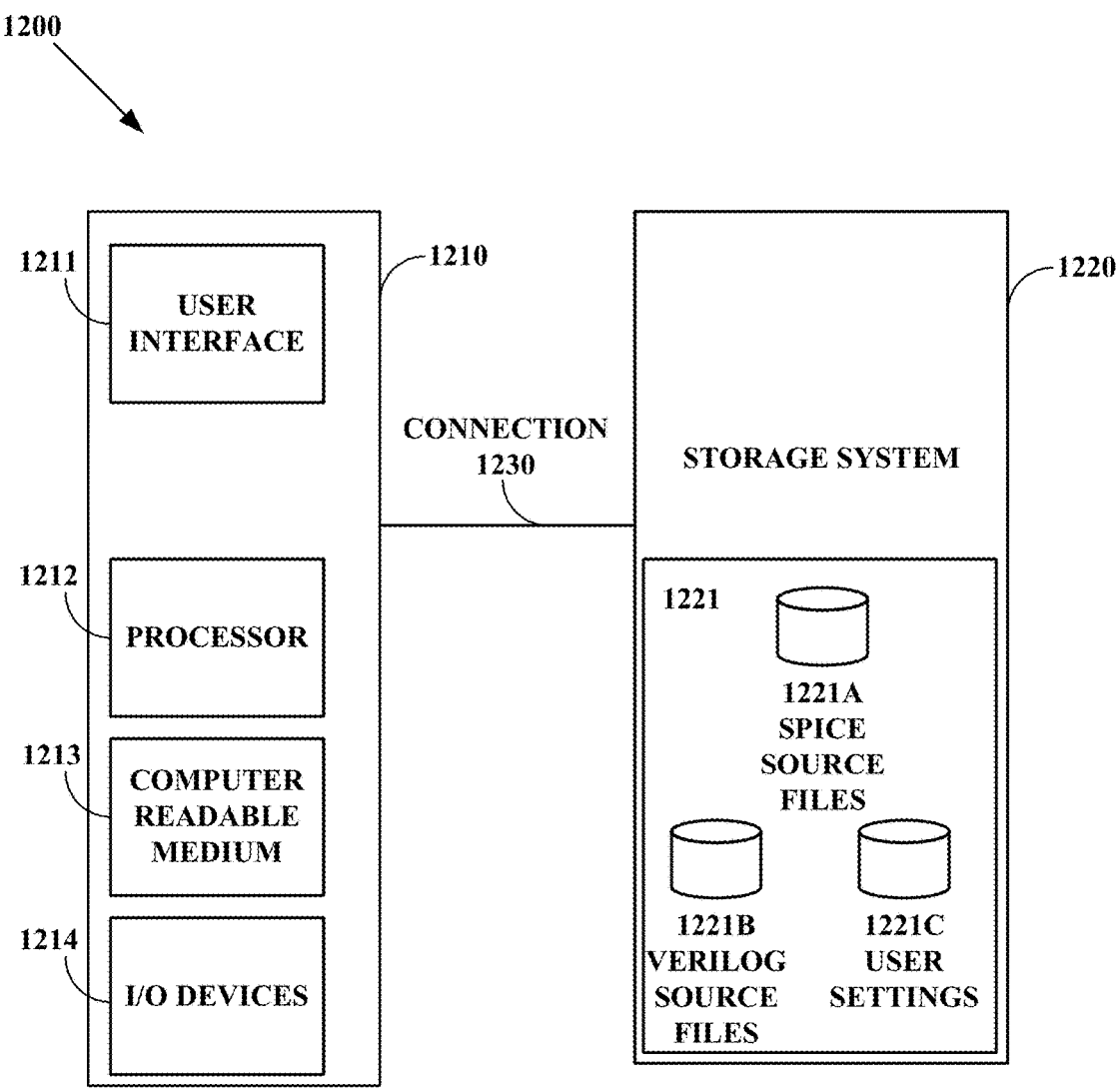
FIG. 12 is a block diagram of a circuit analysis system, according to an embodiment.

FIG. 12 shows a block diagram of an exemplary circuit analysis system 1200, according to an embodiment. This system may provide simulator functionality for any of the methods described above. A user may access the system 1200 through a standalone client system, client-server environment, or a network environment. System 1200 may comprise one or more clients or servers 1210, one or more storage systems 1220, and a connection or connections 1230 between and among these elements.

Client 1210 may execute instructions stored on transitory or non-transitory computer readable medium 1213 with processor 1212, and may provide a user interface 1211 to allow a user to access storage system 1220. The instructions may be part of a software program or executable file that may operate electronic design automation (EDA) software. Client 1210 may be any computing system, such as a personal computer, workstation, mobile computer, or other device employing a processor which is able to execute programming instructions. User interface 1211 may be a GUI run in a user-controlled application window on a display. A user may interact with user interface 1211 through one or more input/output (I/O) devices 1214 such as a keyboard, a mouse, or a touch screen.

Storage system 1220 may take any number of forms, including but not limited to a server with one or more storage devices attached to it, a storage area network, or one or a plurality of non-transitory computer readable media. Databases 1221 may be stored in storage system 1220 such that they may be persistent, retrieved, or edited by the user. Databases 1221 may include SPICE source files 1221A, Verilog source files 1221B, and a user input database 1221C for example. These databases may be kept as separate files or systems, or may be merged together in any appropriate combination.

Only one client 1210 is shown connected to storage system 1220 through connection 1230, which may be a simple direct wired or wireless connection, a system bus, a network connection, or the like, to provide client 1210 with access to storage system 1220. In another aspect, connection 1230 may enable multiple clients 1210 to connect to storage system 1220. The connection may be part of a local area network, a wide area network, or another type of network, again providing one or more clients with access to storage system 1220. Depending on system administrator settings, client 1210's access to system storage 1220 or to other clients may be limited.

Figure 13:
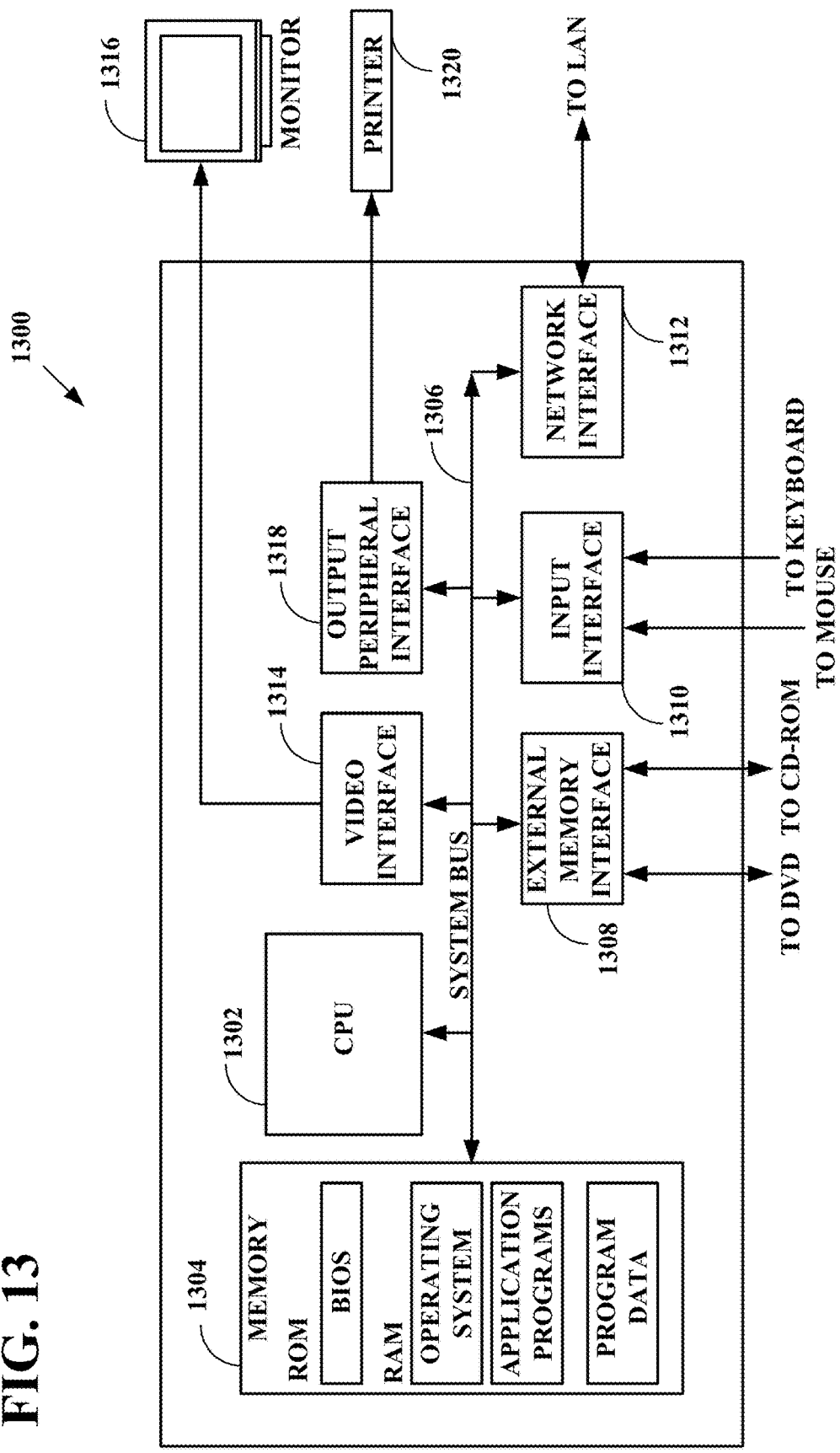
FIG. 13 is a diagram of a computer system, according to an embodiment.

FIG. 13 depicts an exemplary computer system comprising the structure for implementation of the embodiments described above. Computer system 1300 comprises a central processing unit (CPU) 1302 that processes data stored in memory 1304 exchanged via system bus 1306. Memory 1304 typically includes read-only memory, such as a built-in operating system, and random-access memory, which may include an operating system, application programs, and program data. Computer system 1300 also comprises an external memory interface 1308 to exchange data with a DVD or CD-ROM for example. Further, input interface 1310 may serve to receive input from user input devices including but not limited to a keyboard and a mouse. Network interface 1312 may allow external data exchange with a local area network (LAN) or other network, including the internet. Computer system 1300 also typically comprises a video interface 1314 for displaying information to a user via a monitor 1316. An output peripheral interface 1318 may output computational results and other information to output devices including but not limited to a printer 1320.

Computer system 1300 may comprise for example a personal computer or an engineering workstation, each of which is widely known in the art and is commonly used for integrated circuit design tasks, along with software products commercially available for performing computer-aided integrated circuit design tasks. Computer system 1300 may also comprise a mobile computer, including for example a tablet computer or a smart phone. The computer system of FIG. 13 may for example receive program instructions, whether from existing software products or from embodiments of the present invention, via a computer program product and/or a network link to an external site.

For purposes of explanation, specific nomenclature is set forth to provide a thorough understanding of the present invention. Description of specific applications and methods are provided only as examples. Various modifications to the embodiments will be readily apparent to those skilled in the art and the general principles defined herein may be applied to other embodiments and applications without departing from the spirit and scope of the invention. Thus the present invention is not intended to be limited to the embodiments shown, but is to be accorded the widest scope consistent with the principles and steps disclosed herein.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with the practices of persons skilled in the art of computer programming, embodiments are described with reference to operations that may be performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the embodiments may serve as the code segments directing a computing device to perform the necessary tasks. The non-transitory code segments may be stored in a processor readable medium or computer readable medium, which may include any medium that may store or transfer information. Examples of such media include an electronic circuit, a semiconductor memory device, a read-only memory (ROM), a flash memory or other non-volatile memory, a floppy diskette, a CD-ROM, an optical disk, a hard disk, a fiber optic medium, etc. User input may include any combination of a keyboard, mouse, touch screen, voice command input, etc. User input may similarly be used to direct a browser application executing on a user's computing device to one or more network resources, such as web pages, from which computing resources may be accessed.

While particular embodiments of the present invention have been described, it is to be understood that various different modifications within the scope and spirit of the invention are possible. The invention is limited only by the scope of the appended claims.

What is claimed is:

1. A processor-implemented method for interactively viewing log files in an electronic design automation framework, the method comprising, using a processor:
    configuring an interactive log file viewer, displayed in a first portion of a user interface rendered on a display, to identify at least one text object in at least one log file, to render the text object in the first portion of the user interface, and to provide responses triggered by user interaction with the text object;
    configuring an interactive circuit schematic file viewer, displayed in a second portion of the user interface, to identify in a circuit schematic at least one design object corresponding to the at least one text object, and to render the design object in the second portion of the user interface;
    scrolling the log file in the interactive log file viewer by user action;
    while scrolling, concurrently displaying and scanning segments of the log file containing at least one actual text object of interest within the interactive log file viewer, wherein the segments of the log file, for which user-interaction triggered responses are provided for the at least one actual text object of interest, are a current visible page of the log file in the interactive log file viewer along with at least one page of the log file before and/or after the current visible page; and
    dynamically identifying one or more of the actual text objects of interest, rendering the one or more of the actual text objects of interest in the display during the scrolling, and responding to user interaction with the actual text object of interest by invoking a callback action that integrates at least one electronic design automation application,
    wherein the user-interaction-triggered defined responses comprise at least identifying, in the circuit schematic displayed in the interactive circuit schematic file viewer in the second portion of the user interface, at least one design object of interest corresponding to the at least one actual text object of interest, and highlighting and/or selecting the at least one design object of interest in the circuit schematic displayed in the second portion of the user interface based on the user interaction with the at least one actual text object of interest in the first portion of the user interface.

2. The method of claim 1, wherein the configuring comprises registering at least one plug-in that selectively passes text objects matching pre-defined criteria from particular types of log files as arguments to the callback action upon the user interaction.

3. The method of claim 1, wherein the user interaction comprises at least one of moving a cursor over the text object, clicking on the text object with a primary input device button, and/or clicking on the text object with a secondary input device button.

4. The method of claim 1, wherein the rendering comprises displaying the text object in a registered style comprising one of a heading style, a warning style, an error style, and/or a hyperlink style.

5. The method of claim 1, wherein the defined responses additionally comprise at least one of:
    dynamically creating and displaying a tool tip,
    dynamically creating and populating a context window, and/or
    presenting more detail about the corresponding text object in a popup window.

6. The method of claim 1, further comprising, when more than one plug-in is available for processing the log file, selecting a particular plug-in to invoke according to an arbitration process that considers at least one of a supported filename extension and a score indicating a degree of recognition of log file contents by each available plug-in.

7. The method of claim 1, wherein the identifying comprises matching of regular expression memory groups and detection of warning or error states.

8. A non-transitory computer readable medium storing instructions that, when executed by a processor, perform a method for interactively viewing log files in an electronic design automation framework, the processor-implemented method comprising:
    configuring an interactive log file viewer, displayed in a first portion of a user interface rendered on a display, to identify at least one text object in at least one log file, to render the text object in the first portion of the user interface, and to provide responses triggered by user interaction with the text object;
    configuring an interactive circuit schematic file viewer, displayed in a second portion of the user interface, to identify in a circuit schematic at least one design object corresponding to the at least one text object, and to render the design object in the second portion of the user interface;
    scrolling the log file in the interactive log file viewer by user action;
    while scrolling, concurrently displaying and scanning segments of the log file containing at least one actual text object of interest within the interactive log file viewer, wherein the segments of the log file, for which user-interaction triggered responses are provided for the at least one actual text object of interest, are a current visible page of the log file in the interactive log file viewer along with at least one page of the log file before and/or after the current visible page; and
    dynamically identifying one or more of the actual text objects of interest, rendering the one or more of the actual text objects of interest in the display during the scrolling, and responding to user interaction with the actual text object of interest by invoking a callback action that integrates at least one electronic design automation application,
    wherein the user-interaction-triggered defined responses comprise at least identifying, in the circuit schematic displayed in the interactive circuit schematic file viewer in the second portion of the user interface, at least one design object of interest corresponding to the at least one actual text object of interest, and highlighting and/or selecting the at least one design object of interest in the circuit schematic displayed in the second portion of the user interface based on the user interaction with the at least one actual text object of interest in the first portion of the user interface.

9. The medium of claim 8, wherein the configuring comprises registering at least one plug-in that selectively passes text objects matching pre-defined criteria from particular types of log files as arguments to the callback action upon the user interaction.

10. The medium of claim 8, wherein the user interaction comprises at least one of moving a cursor over the text object, clicking on the text object with a primary input device button, and/or clicking on the text object with a secondary input device button.

11. The medium of claim 8, wherein the rendering comprises displaying the text object in a registered style comprising one of a heading style, a warning style, an error style, and/or a hyperlink style.

12. The medium of claim 8, wherein the defined responses additionally comprise at least one of:
dynamically creating and displaying a tool tip,
dynamically creating and populating a context window, and/or
presenting more detail about the corresponding text object in a popup window.

13. The medium of claim 8, the processor-implemented method further comprising, when more than one plug-in is available for processing the log file, selecting a particular plug-in to invoke according to an arbitration process that considers at least one of a supported filename extension and a score indicating a degree of recognition of log file contents by each available plug-in.

14. The medium of claim 8, wherein the identifying comprises detection of regular expression memory groups and detection of warning or error states.

15. A system for interactively viewing log files in an electronic design automation framework, comprising:
a memory storing executable instructions; and
a processor executing instructions to:
configure an interactive log file viewer, displayed in a first portion of a user interface rendered on a display, to identify at least one text object in at least one log file, to render the text object in the first portion of the user interface, and to provide responses triggered by user interaction with the text object;
configure an interactive circuit schematic file viewer, displayed in a second portion of the user interface, to identify in a circuit schematic at least one design object corresponding to the at least one text object, and to render the design object in the second portion of the user interface;
scroll the log file in the interactive log file viewer by user action;
while scrolling, concurrently display and scan segments of the log file containing at least one actual text object of interest within the interactive log file viewer, wherein the segments of the log file, for which user-interaction triggered responses are provided for the at least one actual text object of interest, are a current visible page of the log file in the interactive log file viewer along with at least one page of the log file before and/or after the current visible page; and
dynamically identify one or more of the actual text objects of interest, render the one or more of the actual text objects of interest in the display during the scrolling, and respond to user interaction with the actual text object of interest by invoking a callback action that integrates at least one electronic design automation application,
wherein the user-interaction-triggered defined responses comprise at least identifying, in the circuit schematic displayed in the interactive circuit schematic file viewer in the second portion of the user interface, at least one design object of interest corresponding to the at least one actual text object of interest, and highlighting and/or selecting the at least one design object of interest in the circuit schematic displayed in the second portion of the user interface based on the user interaction with the at least one actual text object of interest in the first portion of the user interface.

16. The system of claim 15, wherein the instructions to configure the interactive log file viewer comprise instructions to register at least one plug-in that selectively passes text objects matching pre-defined criteria from particular types of log files as arguments to the callback action upon the user interaction.

17. The system of claim 15, wherein the user interaction comprises at least one of moving a cursor over the text object, clicking on the text object with a primary input device button, and/or clicking on the text object with a secondary input device button.

18. The system of claim 15, wherein the instructions to configure the interactive log file viewer comprise instructions to render the text object in the display by displaying the text object in a registered style comprising one of a heading style, a warning style, an error style, and/or a hyperlink style.

19. The system of claim 15, wherein the defined responses additionally comprise at least one of:
dynamically creating and displaying a tool tip,
dynamically creating and populating a context window, and/or
presenting more detail about the corresponding text object in a popup window.

20. The system of claim 15, wherein the instructions to identify the actual text object further comprise, when more than one plug-in is available for processing the log file, selecting a particular plug-in to invoke according to an arbitration process that considers at least one of a supported filename extension and a score indicating a degree of recognition of log file contents by each available plug-in.

* * * * *